Figure 1:
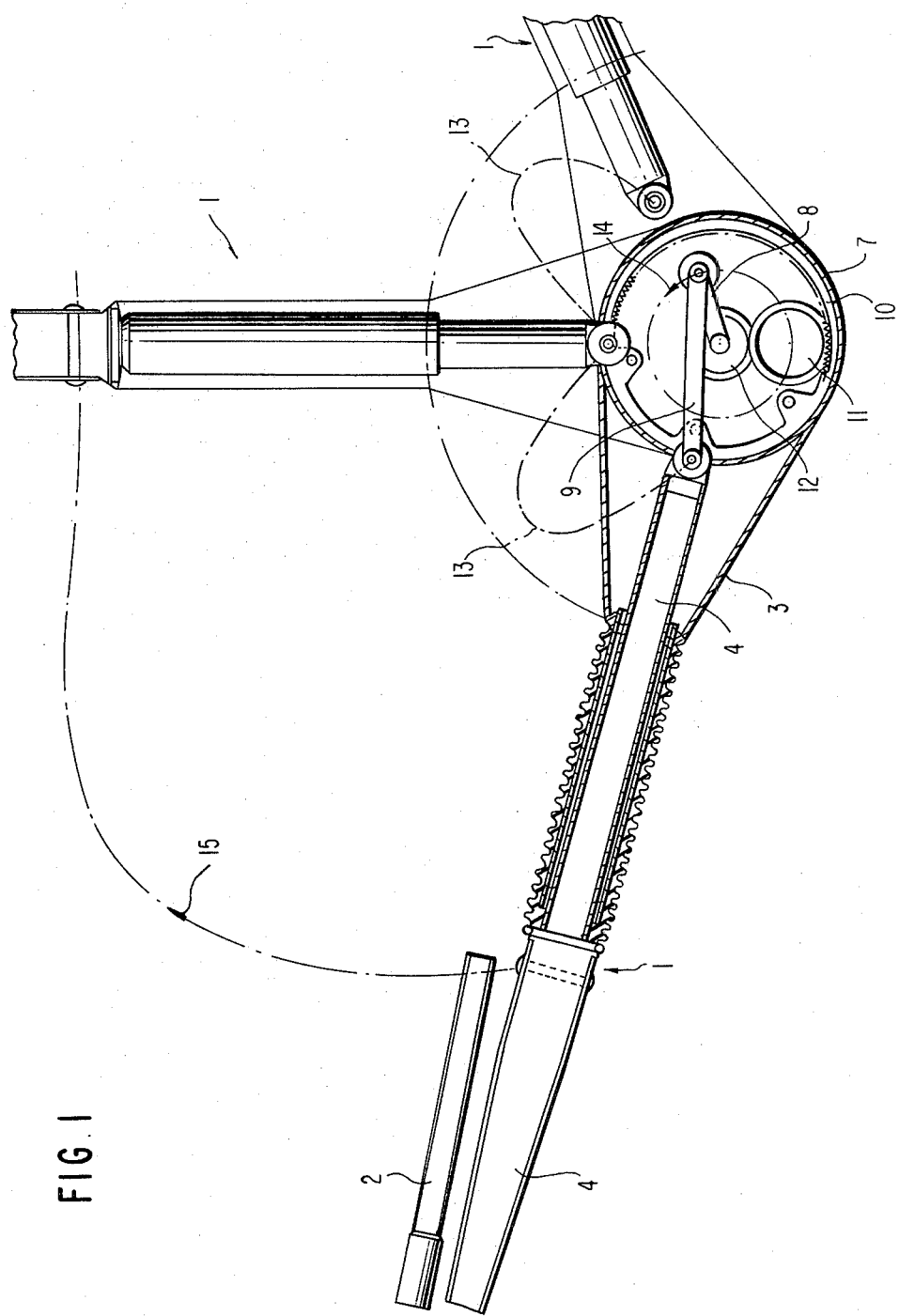

United States Patent [19]

Schüch, et al.

[11] 4,447,928
[45] May 15, 1984

[54] WINDSHIELD WIPER ARRANGEMENT

[75] Inventors: Siegmund Schüch, Boeblingen; Karl-Heinz Nägele, Gaertringen; Arno Jambor, Vaihingen; Bruno Sacco, Sindelfingen, all of Fed. Rep. of Germany

[73] Assignee: Daimler-Benz Aktiengesellschaft, Stuttgart, Fed. Rep. of Germany

[21] Appl. No.: 393,704

[22] Filed: Jun. 30, 1982

[30] Foreign Application Priority Data

Jun. 30, 1981 [DE] Fed. Rep. of Germany ....... 3125628

[51] Int. Cl.³ ................................................ B60S 1/26
[52] U.S. Cl. ................................. 15/250.21; 15/250.23
[58] Field of Search ........... 15/250.13, 250.21, 250.23, 15/250.29

[56] References Cited

U.S. PATENT DOCUMENTS

| 1,270,197 | 6/1918 | Parker | 15/250.21 |
| 2,624,904 | 1/1953 | Wianco | 15/250.23 |
| 3,831,220 | 8/1974 | Gmeiner et al. | 15/250.21 |

FOREIGN PATENT DOCUMENTS 1394414  5/1975  United Kingdom ............ 15/250.23

Primary Examiner—Peter Feldman
Attorney, Agent, or Firm—Craig & Burns

[57] ABSTRACT

A windshield wiper arrangement for motor vehicles which includes a telescopically constructed wiper arm having an effective length which can be altered during a wiping motion by a crank drive which acts upon the wiper arm and serves to create a particularly good wiping field. In order to enable a particularly compact and reliable construction, the drive for the windshield wiper arrangement is accommodated in a lower part of the wiper arm which is constructed as a housing. The drive includes a toothed gearing driven by a wiper drive unit, with the toothed gearing serving to drive the crank drive. The housing is constructed in such a manner that the windshield wiper arm and crank drive have a common axis of rotation.

9 Claims, 2 Drawing Figures

WINDSHIELD WIPER ARRANGEMENT

The present invention relates to a windshield wiper arrangement and, more particularly, to a single arm windshield wiper for motor vehicles, which includes a wiper arm of a telescopic construction having an effective length adapted to be altered during a wiping motion by a crank drive means acting on the wiper arm, and with a lower area of the wiper arm guiding an extendable upper area of the arm.

A windshield wiper system of the aforementioned type is proposed in, for example, German Offenlegungsschrift No. 23 64 427; however, one disadvantage of this proposed system resides in the fact that it requires a very bulky drive which is extremely difficult to cover or encapsulate so that there exists the possibility of exposing the drive to fouling or contamination leading to a possible malfunction. Additionally, without the covering or encapsulation of the drive, there is a potential danger that people may inadvertently come in contact with the components of the drive.

The aim underlying the present invention essentially resides in providing an improved windshield wiper arrangement which includes a compact and easily encapsulated drive unit which ensures a high operating safety and absolutely precludes any potential danger to individuals who may come in contact with the drive unit during, for example, maintenance work, etc., and also ensuring the protection of the drive unit from fouling or contamination.

In accordance with advantageous features of the present invention, a windshield wiper arrangement of the aforementioned type is proposed wherein a lower area of the wiper arm is constructed as a housing means for accommodating a toothed gearing which is driven by a drive unit of the wiper arrangement, with the toothed gearing serving to drive the crank drive and being constructed in such a manner that the windshield wiper arm and crank drive have a common axis of rotation.

Preferably, in accordance with the present invention, the toothed gearing is constructed as an internal gear with two meshing pinions, thereby providing for a particularly compact construction.

Advantageously, the gearing is constructed in such a manner that the internal gear is connected to a lower area of the wiper arm, constructed as the housing, in such a manner that the gear cannot rotate and is arranged concentrically with respect to an axis of rotation of the arm. A first pinion which meshes with the internal gear is arranged in such a manner that it rotates on a shaft mounted on the vehicle, with a second pinion meshing with the first pinion and serving to drive the crank drive, being mounted on the motor shaft of the wiper arm in such a manner so that it can rotate.

In accordance with still further features of the present invention, during each pivot phase of the wiper arm, the wiper arm reaches a minimum length three times and a maximum extended length twice.

Accordingly, it is an object of the present invention to provide a windshield wiper arrangement for a motor vehicle which avoids, by simple means, shortcomings and disadvantages encountered in the prior art.

Another object of the present invention resides in providing a windshield wiper arrangement for motor vehicles which is simple in construction and therefore relatively inexpensive to manufacture.

Yet another object of the present invention resides in providing a windshield wiper arrangement which is of a compact construction and enables an encapsulation of a drive unit of the system.

A still further object of the present invention resides in providing a windshield wiper arrangement having a drive unit which functions reliably under all operating speeds of the arrangement.

Figure 2:
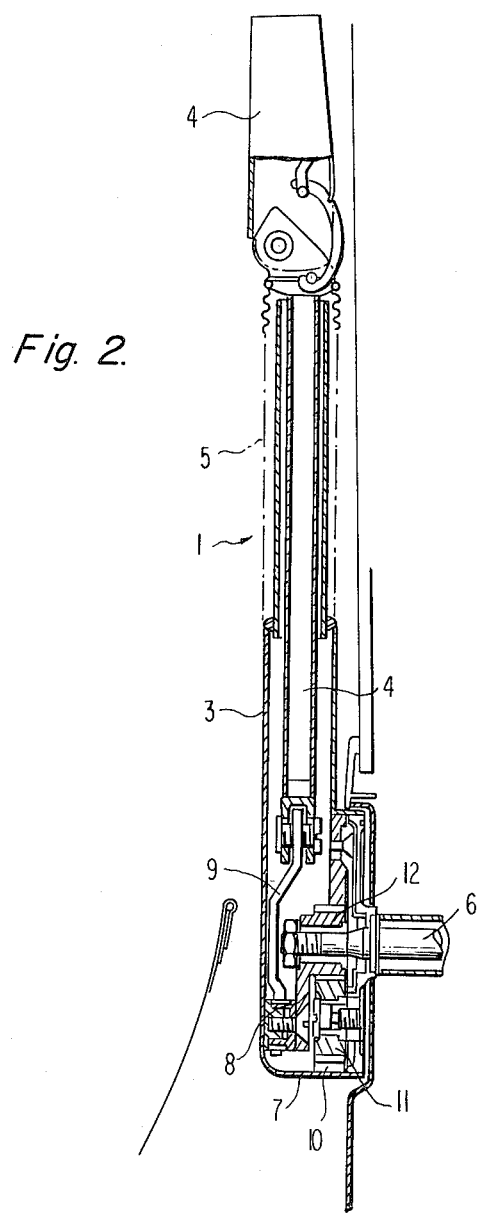

These and other objects, features and advantages of the present invention will become more apparent from the following description when taken in connection with the accompanying drawing which shows, for the purposes of illustration only, one embodiment in accordance with the present invention and wherein:

FIG. 1 is a partially schematic front view of a windshield wiper arrangement constructed in accordance with the present invention; and FIG. 2 is a partial cut-away side view of the windshield wiper drrangement of FIG. 1.

Referring now to the drawings wherein like reference numerals are used in both views to designate like parts and, more particularly, to FIG. 1, in accordance with this figure, a windshield wiper arrangement includes a wiper arm and generally designated by the reference numeral 1 illustrated in a left end position, as viewed from a standpoint of vehicle occupants, a central position, and a right end position. The wiper arm 1 has attached thereto, in a conventional manner, a wiper blade 2, with the wiper arm 1 including a lower area 3 which serves or is constructed as a housing 7 for accommodating a toothed gearing described more fully hereinbelow. The lower area 3 also simultaneously serves as a guide means for an upper portion 4 of the wiper arm 1, to which upper portion 4 the wiper blade 2 is attached. The areas 3, 4 of the wiper arm 1 are connected by a bellows 5.

As shown most clearly in FIG. 2, the lower area 3 of the wiper arm 1 is mounted to a drive shaft 6 secured at the vehicle, with the lower area 3 of the wiper arm 1 being adapted to be pivoted back and forth by the shaft 6 which is, preferably, connected to an electric drive motor (not shown). A toothed gearing for controlling a change in an effective length of the wiper arm 1 is disposed inside the housing 7 with the toothed gearing being effected by means of a crank drive, to be described more fully hereinbelow, which includes two connecting or push rods 8, 9.

An internally toothed gear 10 is attached to the housing 7, with a longitudinal center axis of the internal gear 10 coinciding with a longitudinal center axis of the shaft 6. A first pinion 11, driven by the internally toothed gear 10, is mounted on a shaft secured at the vehicle in such a manner so as to enable the pinion 11 to mesh with and be rotated by the internal toothed gear 10. The first pinion 11 drives a second pinion 12 which is arranged on the shaft 6 in such a manner so as to be rotatable with a connecting rod 8 of the crank drive being attached or secured to the second pinion 12. The connecting rod 8 is hingedly connected to one end of the connecting rod 9, with an opposite end of the connecting rod 9 being linked or connected to the area 4 of the wiper arm 1. During a pivot phase of the wiper 1, the link point between the area 4 and wiper arm 1 traverses a path indicated by the phantom line 13 in FIG. 1 and, in this manner, the crank drive rotates in one direction, and the wiper arm 1 pivots in the other direction as indicated by the path 13 and arrow 15.

With the drive unit driving the wiper arm 1 in the paths indicated in FIG. 1, during one pivot phase of the wiper arm 1, the wiper arm 1 reaches a minimum length three times and a maximum length twice, thereby ensuring an optimum wiping field on a windshield of the vehicle to be cleaned.

While we have shown and described only one embodiment in accordance with the present invention, it is understood that the same is not limited thereto, but is susceptible of numerous changes and modifications as known to one having ordinary skill in the art, and we therefore do not wish to be limited to the details shown and described herein, but intended to cover all such changes and modifications as are encompassed by the scope of the appended claims.

We claim:

1. A windshield wiper arrangement for a motor vehicle comprising telescopic windshield wiper arm means having a lower portion and an extendable upper portion, crank drive means for displacing the extendable upper portion so as to vary an effective length of the wiper arm means during a wiping motion thereof, driving means for driving the crank drive means including a toothed gearing means, wherein the lower portion is constructed as a housing means for accommodating the toothed gearing means and crank drive means and wherein the windshield wiper arm means and crank drive means have a common axis of rotation.

2. A windshield wiper arrangement according to claim 1, wherein the toothed gearing means includes an internally toothed ring gear.

3. A windshield wiper arrangement according to claim 2, wherein the internally toothed ring gear is fixedly mounted to the housing means and concentrically disposed with respect to the axis of rotation of the wiper arm means, the toothed gearing means includes a first rotatably mounted pinion means adapted to mesh with the internally toothed ring gear, a second pinion means adapted to mesh with the first pinion means, the crank drive means being connected to the second pinion means and driven thereby, the drive means further includes a rotatable drive shaft, wherein the second pinion means is mounted on the drive shaft for rotation therewith.

4. A windshield wiper arrangement according to one of claims 1, 2, or 3, wherein said crank drive means is constructed in such a manner that during each full wiping motion of the wiper arm means, the wiper arm means is at a minimum effective length three times and a maximum effective length twice.

5. A windshield wiper arrangement for a motor vehicle comprising telescopic windshield wiper arm means having a lower portion and an extendable upper portion, crank drive means for displacing the extendable upper portion so as to vary an effective length of the wiper arm means during a wiping motion thereof, driving means for driving the crank drive means, said lower portion constructed as a housing means for accommodating at least a portion of the driving means and crank drive means wherein said windshield wiper arm means and said crank drive means have a common axis of rotation and said crank drive means is constructed in such a manner that during each full wiping motion of the wiper arm means, the wiper arm means is at a minimum effective length three times and at a maximum effective length twice.

6. A wiper assembly for continuous reciprocating wiping of a window of a motor vehicle, comprising arm means for supporting a wiper means, drive means for moving said arm means, and wiper means having a blade for engaging and wiping the window, said arm means including a housing portion for accommodating at least a portion of said drive means therein and an extendable portion having the wiper means attached to the distal end thereof, said drive means including means for rotating the arm means and for extending and retracting the extendable portion of the arm means while said arm means is rotating, wherein a maximum effective length of the extendable portion is reached twice and a minimum effective length of the extendable portion is reached three times during each full wiping motion of said wiper assembly.

7. A wiper assembly as set forth in claim 6, wherein the drive means includes a crank drive and a toothed gearing, the crank drive and the arm means having a common axis of rotation.

8. A wiper assembly as set forth in claim 7, wherein the toothed gearing includes an internally toothed ring gear disposed within the housing portion, a first rotatably mounted pinion adapted to mesh with the ring gear, and a second pinion adapted to mesh with the first pinion, wherein said crank drive is connected to and driven by said second pinion.

9. A wiper assembly as set forth in claim 8, wherein said second pinion is mounted on a drive shaft having an axis of rotation concentric with the axis of rotation of the ring gear, the arm means and the crank drive.

* * * * *